(12) United States Patent
Abdel-Hady et al.

(10) Patent No.: US 10,067,913 B2
(45) Date of Patent: Sep. 4, 2018

(54) CROSS-LINGUAL AUTOMATIC QUERY ANNOTATION

(71) Applicant: MICROSOFT TECHNOLOGY LICENSING, LLC, Redmond, WA (US)

(72) Inventors: Mohamed Farouk Abdel-Hady, Cairo (EG); Ahmed Adel Mohamed Abdel-Kader Ashour, Cairo (EG); Rania Mohamed Mohamed Ibrahim, Cairo (EG)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 179 days.

(21) Appl. No.: 13/889,384

(22) Filed: May 8, 2013

(65) Prior Publication Data

US 2014/0337005 A1 Nov. 13, 2014

(51) Int. Cl.
*G06F 17/28* (2006.01)
*G06F 17/20* (2006.01)
*G06F 17/30* (2006.01)

(52) U.S. Cl.
CPC ........ *G06F 17/20* (2013.01); *G06F 17/30705* (2013.01)

(58) Field of Classification Search
CPC ............... G06F 17/20; G06F 17/30705; G06F 17/30693; G06F 17/30864; G06F 17/289; G06F 17/30672; G06F 17/30707
See application file for complete search history.

(56) References Cited

U.S. PATENT DOCUMENTS

| 8,051,061 | B2* | 11/2011 | Niu | G06F 17/30669 704/1 |
| 8,560,539 | B1* | 10/2013 | Engebretsen | G06F 17/3071 707/736 |
| 2002/0099700 | A1* | 7/2002 | Li | G06F 17/30864 |

(Continued)

OTHER PUBLICATIONS

"International Search Report & Written Opinion for PCT Patent Application No. PCT/US2014/037038", dated Sep. 25, 2014, 8 Pages.

(Continued)

*Primary Examiner* — Kevin Ky

(57) ABSTRACT

Cross-lingual automatic query annotation technique is described, for example, to classify online search queries in Arabic as being of commercial intent, without the need to use human judged Arabic queries. In examples, a query classifier available for a source language (such as English) is used to produce a query classifier for a target language (such as Arabic, German, French). In various examples, a target language query log and target language documents may be used to enable target language and target culture dependent queries to be classified. In various examples a click graph with edges weighted by click frequency is used to infer class membership of unlabeled target language queries from target language documents. In examples the target language documents may be classified using a supervised or semi-supervised classifier. In various examples the automatically labeled target language queries are used to train a target language query classifier for information retrieval and/or advertising.

20 Claims, 9 Drawing Sheets

(56) References Cited

U.S. PATENT DOCUMENTS

| | | | |
|---|---|---|---|
| 2005/0228636 A1 | 10/2005 | Erhart et al. | |
| 2010/0082511 A1 | 4/2010 | Niu et al. | |
| 2010/0106704 A1* | 4/2010 | Josifovski | G06F 17/30672 707/708 |
| 2011/0066650 A1 | 3/2011 | Fuxman et al. | |
| 2012/0197627 A1* | 8/2012 | Shi | G06F 17/30705 704/2 |
| 2012/0278309 A1 | 11/2012 | Tang et al. | |
| 2013/0159826 A1* | 6/2013 | Mason | G06F 17/30873 715/205 |

OTHER PUBLICATIONS

Wang, et al., "Cross-Lingual Query Classification: A Preliminary Study", In Proceedings of the 2nd ACM Workshop on Improving Non English Web Searching, Oct. 30, 2008, 4 pages.
Bel, et al., "Cross-Lingual Text Categorization", In Proceedings of Research and Advanced Technology for Digital Libraries, 7th European Conference, vol. 2769, Aug. 17, 2003, 14 pages.
Gao, et al., "Cross-Lingual Query Suggestion Using Query Logs of Different Languages", In Proceedings of the 30th Annual International ACM SIGIR Conference on Research and Development in Information Retrieval, Jul. 23, 2007, 8 pages.
Chang, et al., "Detecting Multilingual and Multi-Regional Query Intent in Web Search", In Proceedings of the Twenty-Fifth AAAI Conference on Artificial Intelligence, Aug. 7, 2011, 6 pages.
Ruch, Patrick, "Query Translation by Text Categorization", In Proceedings of the 20th International Conference on Computational Linguistics, Aug. 23, 2004, 7 pages.
Criminisi, et al. "Decision Forests: A Unified Framework for Classification, Regression, Density Estimation, Manifold Learning and Semi-Supervised Learning" Foundations and Trends® in Computer Graphics and Vision: vol. 7: No. 2-3, pp. 81-227 Now Publishers, Oct. 28, 2011.
Dauméet al. "Domain Adaptation for Statistical Classifiers", In Journal of Artificial Intelligence Research, 26(1) May 2006.

Kumar et al. "A Co-regularization Based Semi-supervised Domain Adaptation". In Proceedings of the Conference on Neural Information Processing Systems (NIPS), Dec. 2010.
Daumé, H. "Frustratingly Easy Domain Adaptation". In ACL, Jun. 2007.
Finkel et al. "Hierarchical Bayesian Domain Adaptation". In NAACL, pp. 602-610, Jun. 2009.
Bennet et al. "Classification-Enhanced Ranking". In Proceedings of World Wide Web, Apr. 2010.
Broder et al. "Robust Classification of rare Queries Using Web Knowledge". In SIGIR '07, pp. 231-238, Jul. 2007.
Gabrilovich et al. "Classifying Search Queries Using the Web as a Source Knowledge". In ACM Transactions on the web. 3(2), Apr. 2009.
Collins-Thompson et al. "Predicting Query Performance Via Classification". In Proceedings ECIR'2010Proceeding of the 32nd European Conference on Advanced Information Retrieval, pp. 140-152, Mar. 2010.
Geo et al. "Exploiting Query Logs for Cross-Lingual Query Suggestions".In Journal ACM Transactions on Information Systems (TOIS). 28(2), May 2010.
Cheng et al. "Translating Unknown Queries with Web Corpora for Cross-Language Information Retrieval". In Proceedings of the 27th Annual International ACM SIGIR Conference on Research and development in Information Retrieval, pp. 146-153, Jul. 2004.
Zhang et al. "Using the Web for Automated Translation Extraction in the Cross-Language Information Retrieval". In Proceedings of the 27th Annual International ACM SIGIR Conference on Research and development in Information Retrieval, pp. 162-169, Jul. 2004.
Li et al. "Learning With Click Graph for Query Intent Classification". In Journal ACM Transactions on Information Systems (TOIS) 28(3), Jun. 2010.
Liu et al. "Automatic Search Engine Performance Evaluation With Click-Through Data Analysis". In Proceedings of the 16th International Conference on the World Wide Web, pp. 1133-1134, May 2007.
Littman et al. "Automatic Cross-Language Information Retrieval Using Latent Semantic Indexing". Oct. 7, 1996.

* cited by examiner

CROSS-LINGUAL AUTOMATIC QUERY ANNOTATION

BACKGROUND

Query intent classifiers are used by information retrieval and/or targeted advertising systems to annotate an online search query whether having a certain type of intent such as adult, commercial, health, sports, news, music, travel, movie, or local intent.

Training query classifiers/annotators is a supervised machine learning task that requires a large amount of labeled training queries. The labeled training queries are typically obtained by using human judges to manually classify queries. This is a time consuming, expensive and error prone process. Because of this, existing trained query classifiers are typically available for only a limited number of spoken/written languages such as English. An existing query classifier typically operates for only a single language.

The embodiments described below are not limited to implementations which solve any or all of the disadvantages of known query classifiers or methods of creating or training query classifiers.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Cross-lingual query classification is described, for example, to classify online search queries in Arabic as being of commercial intent, without the need to use human judged Arabic queries. In examples, a query classifier available for a source language (such as English) is used to produce a query classifier for a target language (such as Arabic). In various examples, a target language query log and target language documents may be used to enable target language and target culture dependent queries to be classified properly. In various examples a click graph with edges weighted by click frequency is used to infer class membership of unlabeled target language queries from target language documents. In examples the target language documents may be classified using a supervised or semi-supervised classifier. In various examples the automatically labeled target language queries are used to train a target language query classifier for information retrieval and/or targeted advertising.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a query classification system for classifying queries as being of commercial intent or not, the system described is provided as an example and not a limitation. As those skilled in the art will appreciate, the present examples are suitable for application in a variety of different types of query classification systems, systems for creating query classifiers, information retrieval systems, advertising systems. In the examples described the source language is English and the target language is Arabic. However, other source and target languages may be used.

Query intent classifiers are used by information retrieval and/or targeted advertising systems to classify an online search query whether having a certain type of intent such as adult, sports, health, music, travel, local, or commercial intent. Training such classifiers for each emerging market/language is a supervised machine learning task that requires a large amount of labeled training queries. The manual annotation of training queries for each new emerging language using human judges is expensive, error-prone and time consuming. In examples cross-lingual automatic query annotation technique based on document feedback is described. In some examples, methods leverage existing query classifiers in a source language (such as English) and the abundant unlabeled queries in a query log of the underserved target language (such as French, German, Arabic, or Chinese) to reduce the cost and time, and to automate a training data annotation process. The frequently clicked search results of a query may be used to predict the intent of this query instead of human judges. A document classifier may be trained on hidden topics extracted by latent semantic indexing from the translation of source language documents into the target language.

Figure 1:
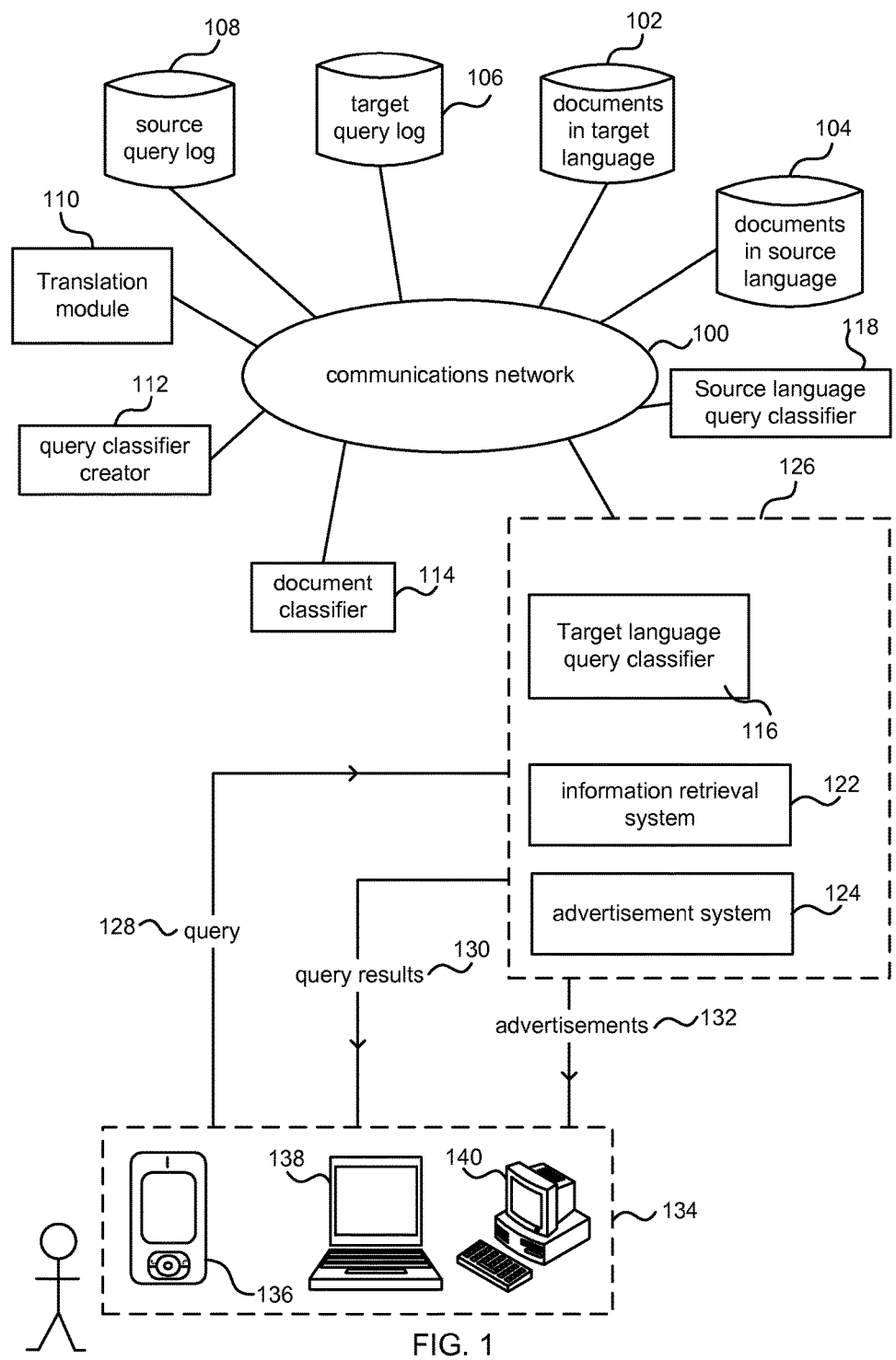
FIG. 1 is a schematic diagram of a query classifier used together with an information retrieval system and an advertising system.

FIG. 1 is a schematic diagram of a query classifier 116 used together with an information retrieval system 122 and an advertising system 124. The information retrieval system 122 is able to receive a query 128 from end user equipment 134 over a communications network of any suitable type.

The query may be an online search query comprising text such as one or more words in a target language such as Arabic. The information retrieval system comprises functionality to search one or more indexes of documents and compute results in the form of a ranked list of addresses of documents in response to a user submitted query. One or more items from the ranked list may be returned to the end user equipment as query results 130. The information retrieval system is able to use query class information from the query classifier 116 to improve the relevance of the ranked list of results to the query 128. The end user equipment may be a smart phone 136, a laptop computer 138, a personal computer 140 or any other end user equipment which is able to communicate with the information retrieval system 122.

The query classifier 116 is computer implemented using software and/or hardware and is arranged to classify the query 128 (or annotate it) as belonging to one of a set of (one or more) specified types of user intent such as adult or commercial intent. The query classifier 116 may be a target language query classifier which has been trained on queries in the target language such as French, German, Chinese, or Arabic, that are auto-labeled using the methods described herein without the need for human judges. After the training phase, the query classifier is able to classify queries in the target language with better accuracy than previously possible and in a way which is able to deal appropriately with target language dependent and target culture dependent queries.

The advertisement system 124 is also computer implemented using software and/or hardware and is arranged to use output from the target language query classifier 116 to select more appropriate advertisements 132 to be sent to the end user equipment 134.

The methods described herein give examples of how the target language query classifier 116 may be trained on automatically labeled training queries without the need for human judged queries in the target language. The methods use various entities which may be in communication with the target language query classifier 116, the information retrieval system 122 and the advertisement system 124 over a communications network 100 of any suitable type. A query classifier creator 112 may implement and manage the methods in order to automatically create the target language query classifier 116. The query classifier creator 112 is computer implemented using software and/or hardware and is in communication with various entities over communications network 100.

For example, these entities comprise a source language query classifier 118 which is computer implemented using software and/or hardware. The source language query classifier 118 may have been created using human judged queries in the source language. It is able to give accurate classification results for queries in the source language for at least those classes of query for which the target language query classifier 116 operates. For example, the source language query classifier may comprise a support vector machine or other classification technology including logistic regression or, random forest. In an example a linear kernel support vector machine is used. Random forests are described in detail in Criminisi et al "Decision Forests: A Unified Framework for Classification, Regression, Density Estimation, Manifold Learning and Semi-Supervised Learning" 2012 In: Foundations and Trends in Computer Graphics and Vision: Vol. 7: No 2-3, pp 81-227 NOW Publishers. The main objective of a support vector machine is to find the optimal separating hyper-plane that minimizes the generalization error through maximizing the margin between positive and negative training examples. An unseen example is assigned to one of the two classes based on its position relative to the separating hyper-plane Documents in the target language 102 and documents in the source language 104 are accessible to the query classifier creator 112 and other entities via the communications network 100. Two sources of these documents are illustrated in FIG. 1 for clarity although in practice many more sources of documents may be present. A document may be all or part of a web page, an email, a news article, a text document, a blog, or any other item comprising text.

A source query log 108 and a target query log 106 are also accessible to the query classifier creator 112 over the communications network 100. The source query log comprises a memory storing queries in a source language (such as English) which have been input to an information retrieval system. The information retrieval system may be the information retrieval system 122 illustrated in FIG. 1 or may be another information retrieval system. The query log also stores addresses (such as uniform resource locators URLs) of documents (usually in the source language) found by the information retrieval system in response to the queries submitted by users. As well as this the query log stores click frequencies, that is, a number of times a URL was clicked by the users when presented as a result of a specified query. The target query log is the same as the source query log where the queries are in a target language and where the URLs are generally of documents in the target language. The information retrieval system used to obtain the target language query log may be a different information retrieval system from that used to obtain the source language query log.

A translation module 110 is accessible to the query classifier creator 112 via the communications network 100. The translation module 110 is computer implemented using software and/or hardware. For example, it may be a machine translation system which is able to automatically translate documents from the source language into the target language. It may comprise a bilingual dictionary in some examples. In some examples the translation module 110 maps source language documents to a language-independent semantic space through topic modeling methods such as canonical correlation analysis.

At least one document classifier 114 is accessible to the query classifier creator 112 via the communications network 100. The document classifier is computer implemented using software and/or hardware. In some examples the document classifier uses the source query log to classify documents in the source language as having a query class. In some examples a document classifier is trained to classify documents in the target language into query classes.

Figure 2:
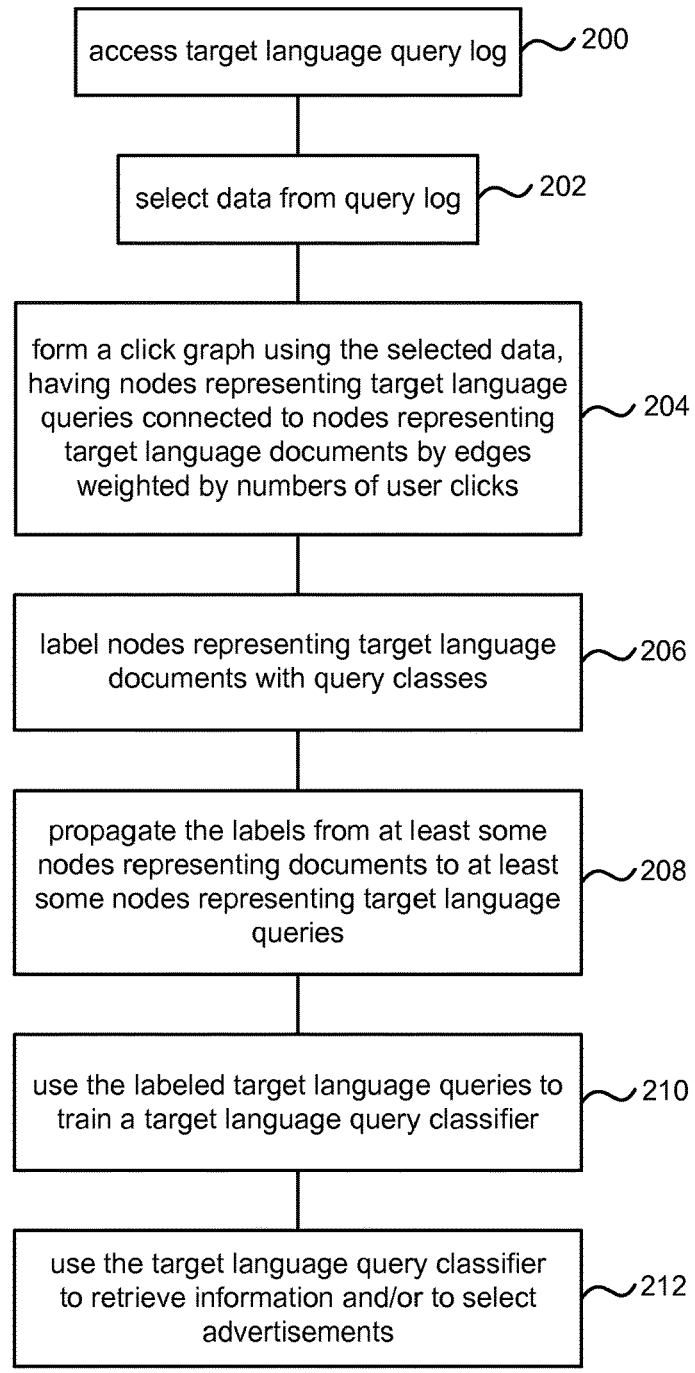
FIG. 2 is a flow diagram of a method of creating a target language query classifier.

FIG. 2 is a flow diagram of a method of creating a target language query classifier. This method may be implemented and/or managed by the query classifier creator 112 of FIG. 1 using several of the entities illustrated in FIG. 1 as now described. The query classifier creator 112 accesses 200 the target language query log and selects 202 data from the query log. For example, the selection involves finding queries in the query log which are not yet classified and selecting the URLs (of target language documents) retrieved for those queries which have the highest click frequencies. In some examples the query log is already provided in the form of a click graph when it is accessed. In other examples the query classifier creator forms 204 a click graph from the data it selects from the query log. To form a click graph from the selected data the query classifier creator makes a node for each target language query which is not yet classified. It makes a node for each selected URL (of a target language document). It connects the target language query nodes to the nodes representing the URLs using edges which are weighted on the basis of the click frequencies. A click frequency is a number of times a user clicked on a URL.

By using the target language query log, the query classifier creator is better able to classify target language queries than previous systems. This is because real target language queries are used in the training of the target language query classifier rather than queries which originate in a source language and are translated to the target language. For example, when using real target language queries, culture-dependent information such as named entities (person, location, organization, and celebrity names), and colloquial expressions are taken into account.

The query classifier creator 112 labels 206 the nodes representing the target language URLs with query classes. This is achieved in one of a variety of ways described in more detail below with reference to FIGS. 5 and 6. The process for labeling the nodes representing the target language URLs takes into account all or at least part of the target language documents associated with the target language URLs. This also enables the query classifier creator to more accurately classify target language queries. The documents typically contain more information than the queries and so are more useful for making the classification. Also, the documents enable culture-dependent as well as market-dependent information to be taken into account.

Once the nodes representing the target language URLs are labeled with query classes, the query classifier creator 112 propagates 208 the labels from at least some of the URL nodes to at least some of the target language query nodes. The label propagation process takes into account the weights of the query-URL edges in the click graph. The weight of a query-URL pair may depend on one or more of: the frequency of user clicks, or the rank of the URL in the query search result and this improves classification accuracy of the resulting query classifier.

The resulting labeled target language query nodes give labeled target language queries which are used to train 210 a target language query classifier 116. Any supervised machine learning algorithm may be used.

The target language query classifier 116 may be used 212 to retrieve information and/or to select advertisements as described above with reference to FIG. 1.

Figure 3:
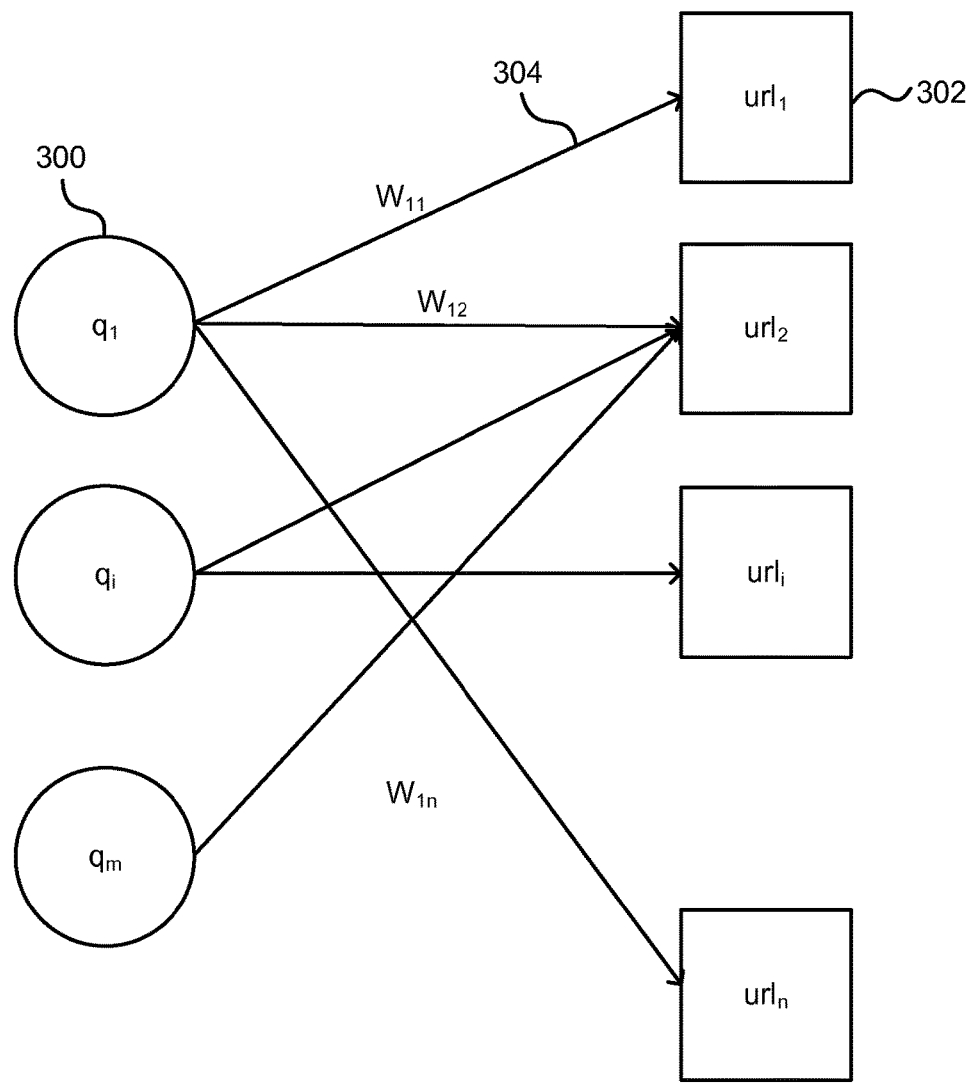
FIG. 3 is a schematic diagram of part of a click graph.

FIG. 3 is a schematic diagram of at least part of a click graph. One node 300 for each unlabeled query from a query log is formed. These are shown as circular nodes in the example of FIG. 3. One node 302 for each labeled URL is formed and illustrated in FIG. 3 as a square node. Each query node 300 is connected to one or more URL nodes using weighted edges. The weights may be related to numbers of clicks. The weights may be normalized so that the weights on the edges from a given query node sum to one.

Figure 4:
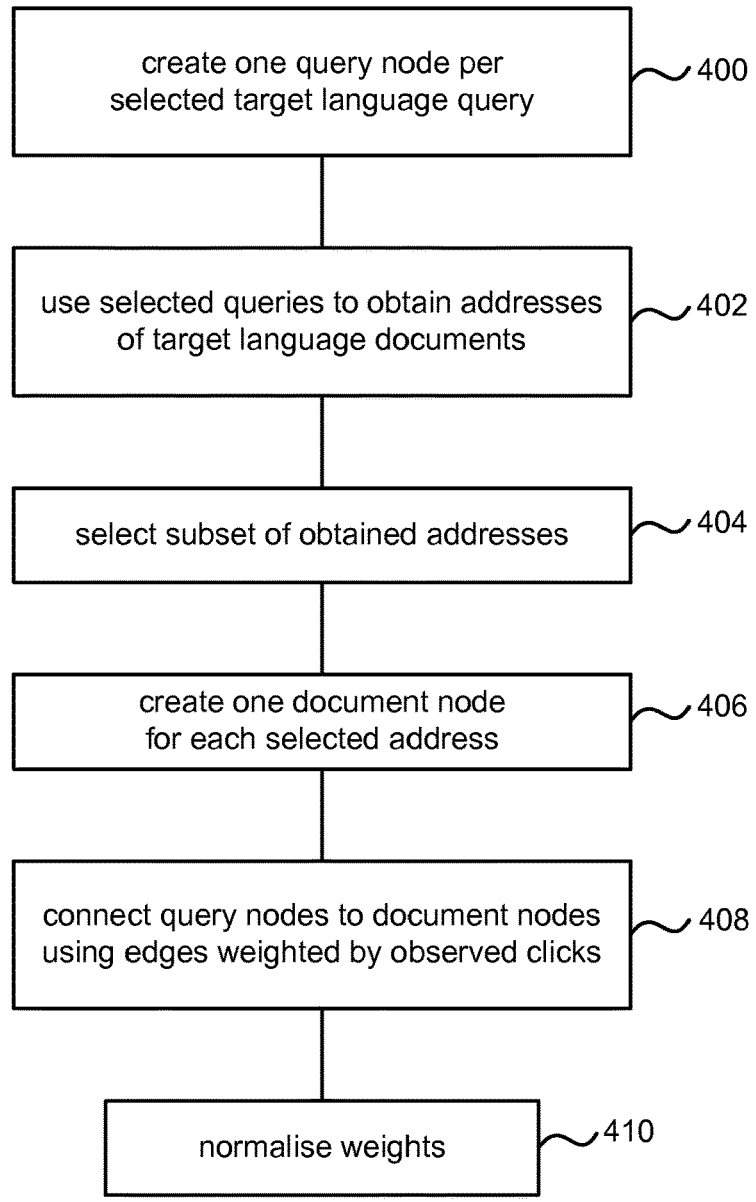
FIG. 4 is a flow diagram of a method of forming a click graph.

FIG. 4 is a flow diagram of a method of creating a click graph such as that of FIG. 3. One query node is created per selected target language query 400. The target language queries may be selected from the target query log in any suitable manner. The selected queries are used 402 to obtain addresses (URLs) of target language documents from the query log. For example, these are URLs of documents returned by an information retrieval system in response to the query. A subset of the obtained addresses (URLs) is taken 404, for example, by selecting those URLs with the highest click frequencies.

A document node is created 406 for each selected address. The query nodes are connected 408 to the document nodes using edges which are weighted by observed click frequencies. The weights may be normalized 410 so that the weights on edges emanating from a given node sum to one.

Figure 5:
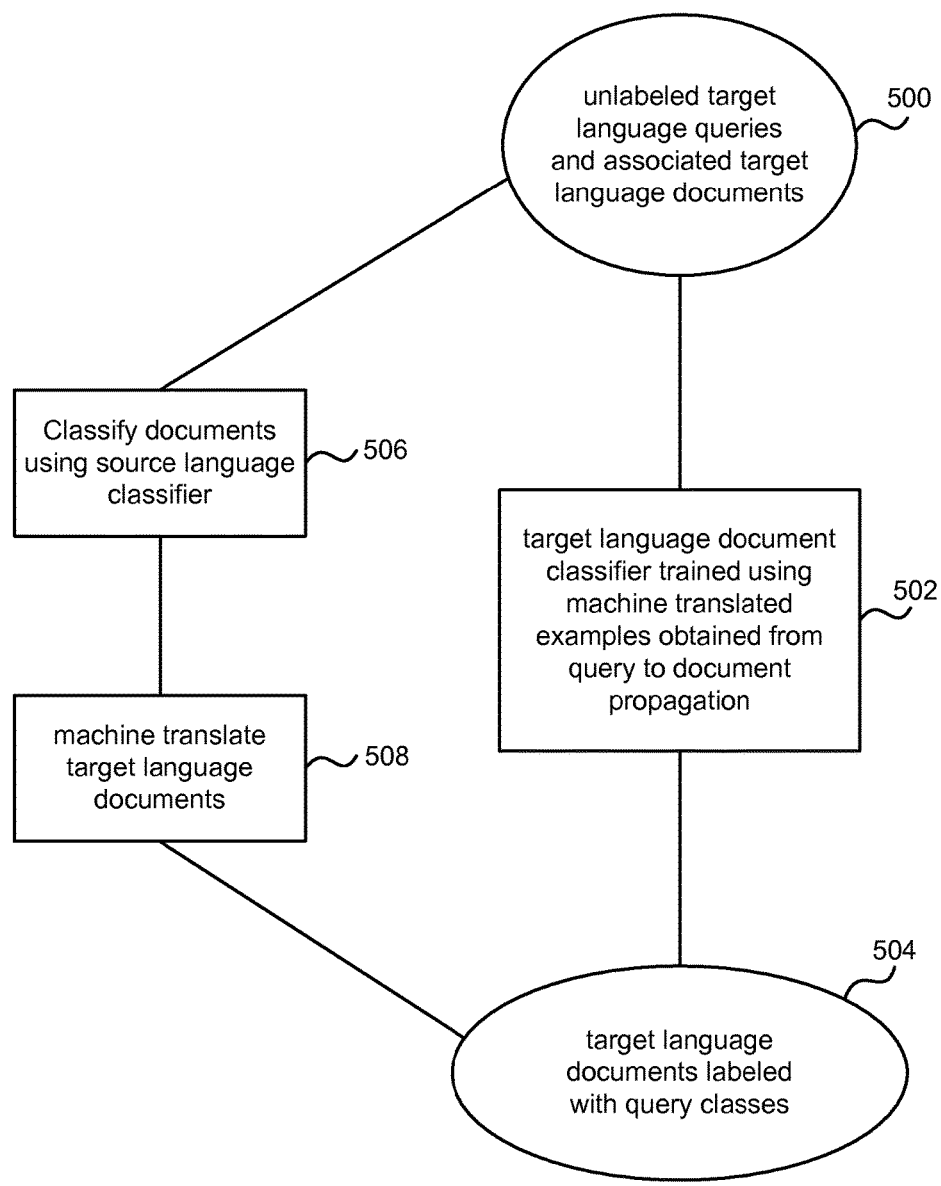
FIG. 5 is a flow diagram of a method of labeling target language documents.

FIG. 5 is a flow diagram of methods of labeling target language documents with query classes. These methods or other suitable methods may be used at step 206 of FIG. 2.

Unlabeled target language queries and associated target language documents are available 500 to the query classifier creator. For example, the target query log 106 gives the unlabeled target language queries and it gives URLs associated with those queries. An information retrieval system may be used to retrieve all or part of target language documents at the URLs. This may be done for a subset of the URLs selected according to click frequency or in other ways.

The target language documents may be classified 504 (into query intent types such as adult, health, commercial intent, etc.) using a target language document classifier 502. By using documents to carry out the classification, accuracy is improved and cultural information in the documents may be used (as compare with classifying using queries or using documents in a source language). In some examples the target language document classifier is trained using supervised training. The labeled training data may comprise documents originating in the source language, which are classified into query classes using a source language query log, and which are translated to the target language. This is described in more detail with reference to FIG. 6 and FIG. 7. In other examples, semi-supervised training is used where training data comprises some labeled source language documents translated into the target language and a large amount of unlabeled real documents in the target language. This is described in more detail below with reference to FIG. 8. Semi-supervised training gives the benefit that unlabeled training data which is readily available in the target language may be used and this facilitates ability of the trained system to incorporate target language culture-dependent information such as named entities (location, restaurant, celebrity names, etc.) into the training data.

In some examples the documents are classified 506 into query classes using a classifier trained in the source language. The classified documents may then be translated 508 into the target language using machine translation.

As described with reference to FIG. 5, in some examples, a target language document classifier is used to classify target language documents into query classes (such as commercial intent or no commercial intent). The target language document classifier may be formed automatically without the need for human judged target language documents. This is achieved by using a source language query log, source language documents, some type of translation from source to target language, and machine learning techniques to train the target language document classifier.

Figure 6:
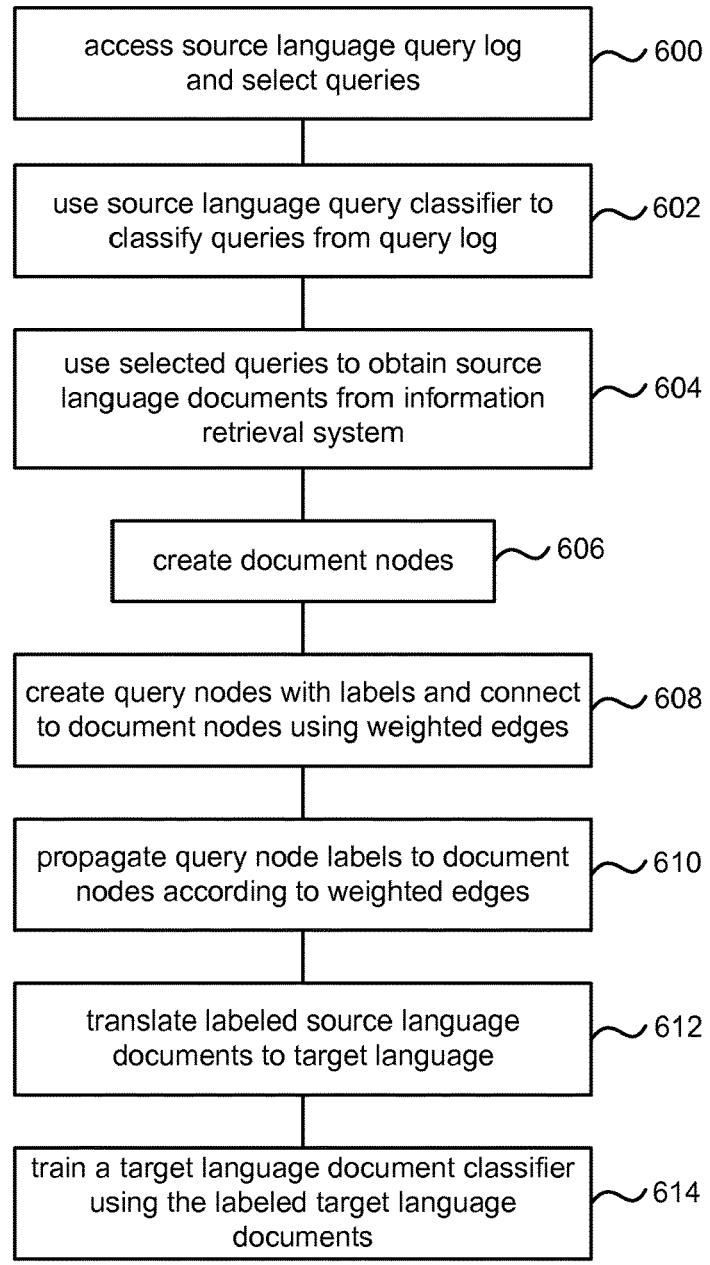
FIG. 6 is a flow diagram of a method of creating and training a target language document classifier for use with the method of FIG. 5.

With reference to FIG. 6 the query classifier creator may access a source language query log and select 600 a plurality of queries from the query log. The selection mechanism may consider the popularity of queries in order to eliminate atypical queries such as those which appear a huge number of times in the query log.

A source language query classifier is used to classify 602 the selected queries from the query log. Queries which are classified with high certainty are selected and used to obtain 604 source language documents from an information retrieval system. For example, the search results information of each query, such as URLs to each web document and the number of user clicks on it, is available from the source query log. For each source language labeled query the most clicked URLs in the search results are retrieved and the content of the referred web documents are crawled and stored.

Document nodes are created 606 for the retrieved documents and query nodes with labels are created 608 and connected to the document nodes using weighted edges. The query node labels are propagated 610 to the document nodes according to the weighted edges.

The labeled source language documents are translated to the target language 612 using translation module 110. The translation module adopts any technique to cross the language barrier such as using a bilingual dictionary, using a machine translation system, mapping to a language independent semantic space through topic modeling or any combination of these or other techniques. The translation is assumed to preserve the intent. That is, both the original document and its translation have the same query classification.

The labeled translated documents are used to train 614 a target language document classifier using any suitable machine learning techniques including but not limited to support vector machines, random decision forests, and others.

Figure 7:
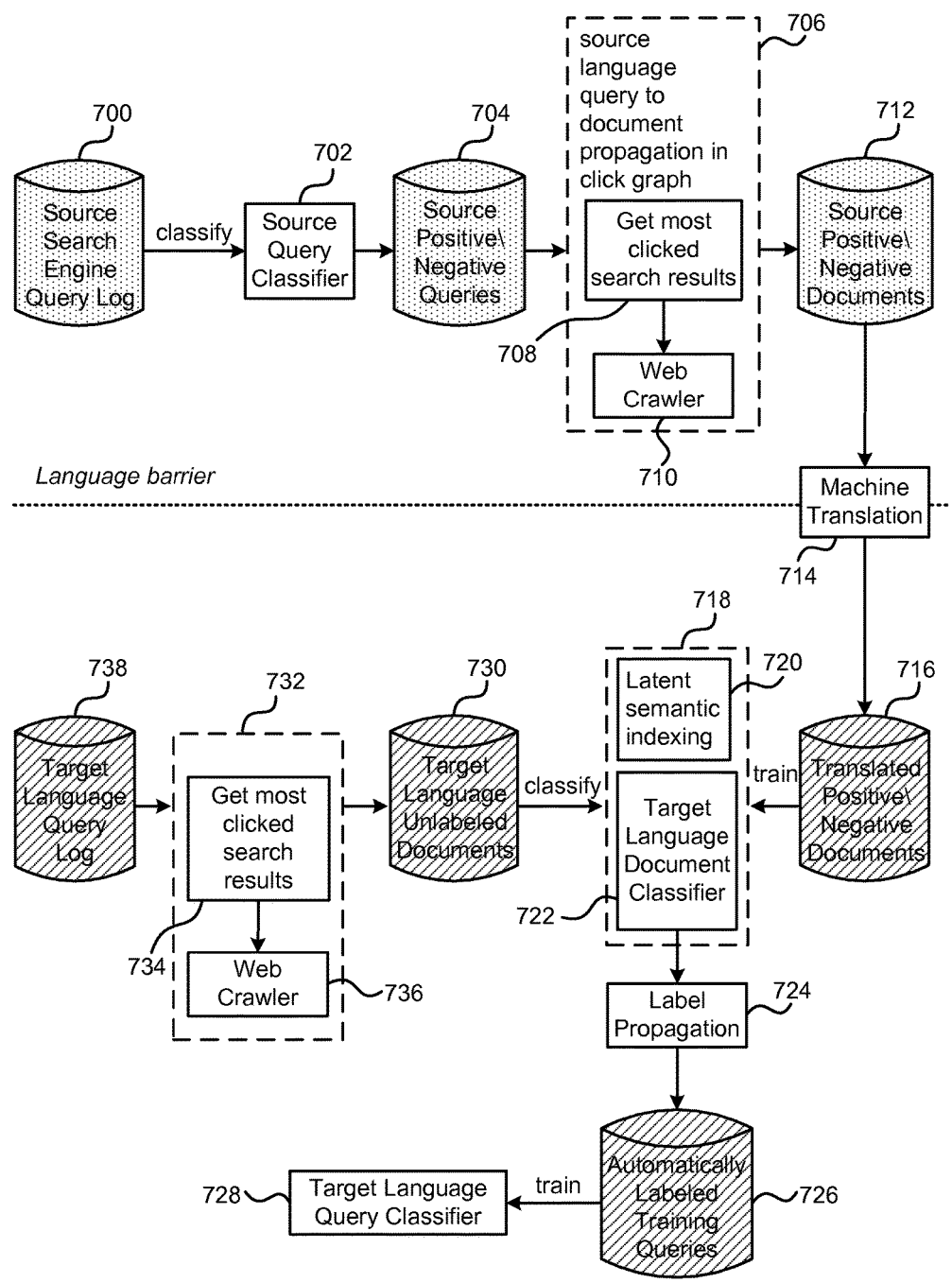
FIG. 7 is a schematic diagram of components of FIG. 1 used for creating a query classifier.

In an example, as illustrated in FIG. 7, latent semantic indexing topic modeling is used as part of the process of training the target language document classifier. Latent semantic indexing (LSI) is a topic modeling method that uses a mathematical technique called singular value decomposition (SVD) to identify patterns in the relationships between the terms contained in an unstructured text corpus. It is based on the principle that words that are used in the same contexts tend to have similar meanings (semantic). A key feature of LSI is its ability to extract the semantic of a body of text by finding the correlation between those terms that occur in similar contexts. One can think about LSI as grouping words into clusters based on their co-occurrence where each cluster is called latent topic or semantic direction and all topics represent a semantic space. For a given document, its degree of membership to each extracted latent topic is used as a feature vector to represent the document as well as a query class from the label propagation step 610 as its label. The latent topic features may be used as input to a classification system such as a random forest. Once trained the random forest may be presented with unlabeled target language documents and it assigns query class labels to those target language documents. For example, as described above with reference to step 206 of FIG. 2. The unlabeled target language documents are pre-processed to extract topic features which are pushed through the trained random forest in order to obtain at least one query class label and associated confidence score.

FIG. 7 is a schematic diagram of components of FIG. 1 used for creating a query classifier. A dotted line horizontally across FIG. 1 is used to denote a language barrier so that components above this line in FIG. 1 use or comprise source language material and components below this line use or comprise target language material. A machine translation component 714 is on the dotted line as it translates across the language barrier. This machine translation component 714 is an example of the translation module 110 of FIG. 1.

The components above the dotted line, which use or comprise source language material (such as English language documents) comprise: a source search engine query log 700 which is an example of source query log 108 of FIG. 1; a source query classifier 702 which is an example of source language query classifier 118 of FIG. 1; a store of source language positive/negative queries 704 (part of the source query log 108 of FIG. 1); a source language query to document propagation component 706 (part of the query classifier creator 112 of FIG. 1); and a store of source language positive/negative documents 712 which may be part of the source language document store 104 of FIG. 1 or may be stored at another entity. The source language query to document propagation component 706 comprises, or uses functionality 708 to select search results on the basis of click frequency and a web crawler 710 to download documents associated with the selected search results. The documents downloaded by the web crawler may be filtered to remove links to other documents or other data which is not needed for document classification.

The components below the dotted line, which use or comprise target language material (such as Arabic language documents) comprise: a target language query log 738 which is an example of the target query log 106 of FIG. 1; a component 732 for selecting and accessing target language documents (which may be part of the query classifier creator 112 of FIG. 1); a store 730 of target language unlabeled documents which is an example of document store 102 of FIG. 1; a classifier 718 for classifying target language documents into query classes (which is an example of document classifier 114 of FIG. 1); a store 716 of translated documents which are classified into query classes; a label propagation component 724 (which may be part of query classifier creator 112 of FIG. 1); a store of labeled training queries 726 and a target language query classifier 728 (which is an example of query classifier 116 of FIG. 1).

The component 732 for selecting and accessing target language documents 732 comprises or uses functionality 734 to select search results from the target language query log 738 on the basis of click frequency. It also comprises or uses a web crawler 736 to download documents associated with the selected search results.

The classifier 718 for classifying target language documents into query classes comprises a latent semantic indexing component 720 which implements latent semantic index topic modeling as described above. This component receives input from the translated positive/negative document store 716 and extracts topic features from those documents. These features and the associated positive/negative labels provide labeled training data to train the target language document classifier 722. This classifier may be a support vector machine or any other type of classifier. The latent semantic indexing component 720 also takes input from the target language unlabeled document store 730. It extracts topic features from those documents which are input to the trained classifier 722. The trained classifier is able to classify the documents on the basis of the extracted features. In this way the target language unlabeled documents from store 730 become labeled with query class labels. The label propagation component 724 is then able to propagate labels in a click graph from nodes representing the labeled translated documents 716 to query nodes representing queries from query log 738. The propagation may be on the basis of click frequencies recorded in the query log and represented by weighted edges in the click graph as described above. A click frequency is a measure of how often a user selected an address of a document in a list of addresses of documents obtained in response to a query. Automatically labeled training queries 726 are obtained as a result of the label propagation 724. The labeled training queries 726 are used to train a target language query classifier 728 using suitable machine learning technology as described above.

Figure 8:
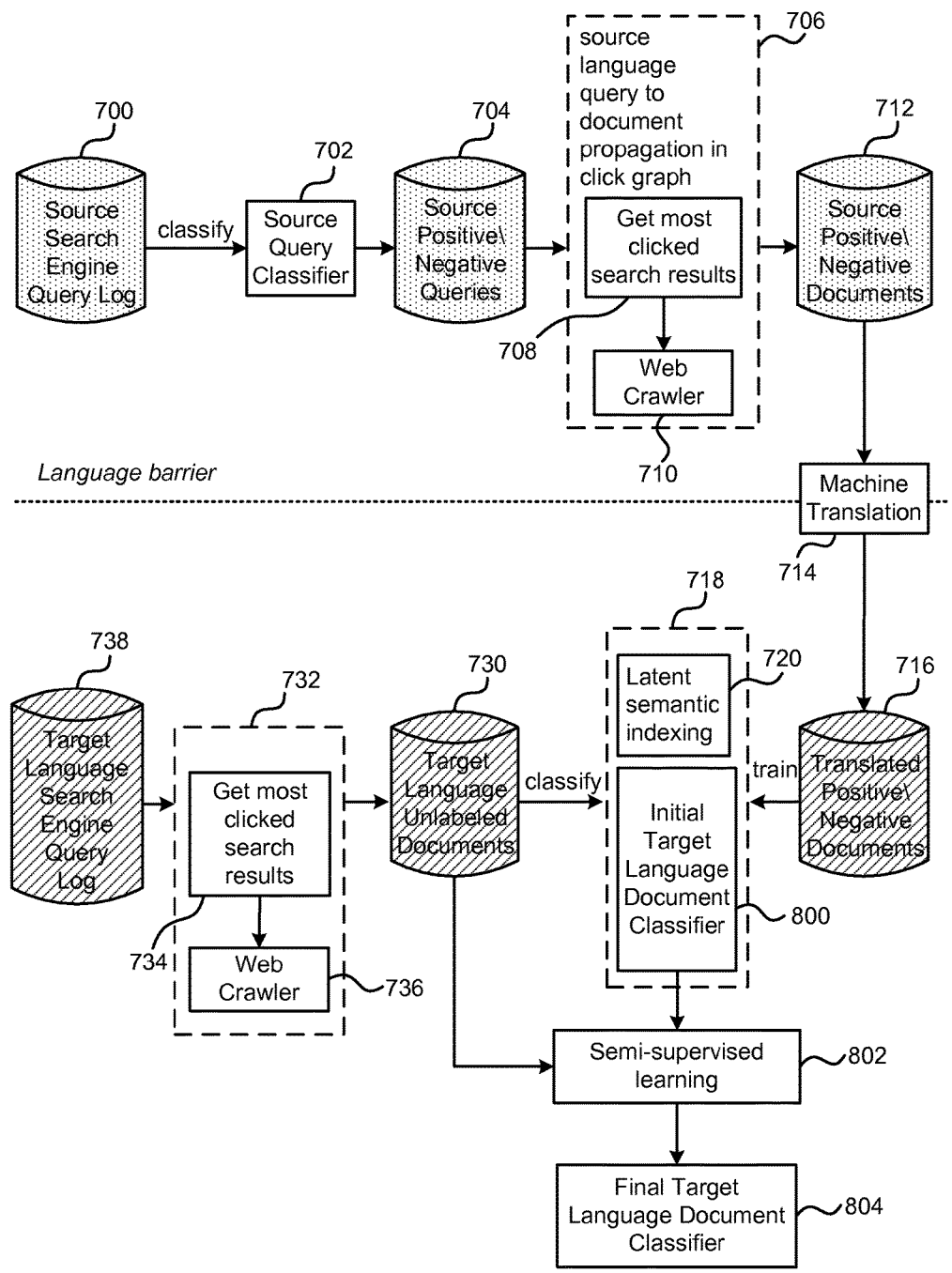
FIG. 8 is a schematic diagram of another example of components of FIG. 1 used for creating a query classifier.

FIG. 8 is a schematic diagram of components of FIG. 1 used for creating another example of a query classifier. In this example, semi-supervised machine learning is used to train the target language document classifier. Semi-supervised machine learning uses training data comprising at least some labeled training examples and at least some unlabeled training examples. This enables unlabeled target language documents which are readily available in large quantities to be used to further improve the quality of the target language document classifier and enable it to deal with target language and target culture specific documents.

The components of FIG. 8 are the same as those of FIG. 7 where indicated using the same reference numerals. The translated positive/negative documents 716 are used to train an initial target language document classifier 800. This initial target language document classifier may, in some examples, be similar to the target language document classifier 722 of FIG. 7. That is, it may be created by using latent semantic indexing to extract topic features from the translated documents 716 and to use the extracted features and the positive/negative labels to train a classifier. For example, using support vector machines, random forests or other types of classification technology.

The initial target language document classifier 800 may be used to label target language document 730 and these labeled target language documents 730 may be used as labeled training data for input to a semi-supervised learning process 802. The semi-supervised learning process 802 also receives unlabeled training data from the target language document store 730. The unlabeled training data may be processed to extract topic features using latent semantic indexing 720 or in other ways. The features may represent the unlabeled training data input to the semi-supervised learning process 820.

The semi-supervised learning process may comprise support vector machine technology, expectation maximization technology or other semi-supervised learning technology.

The output of the semi-supervised learning process is a target language document classifier 804. The target language document classifier 804 may be used to classify target language unlabeled documents 703 which have not yet been used by the components of FIG. 8. Document to query propagation may then be used to automatically label training queries in the same way as described above for FIG. 7 with respect to components 724 and 726 of FIG. 7. A target language query classifier may be trained using the automatically labeled training queries as described above with reference to FIG. 7.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs).

Figure 9:
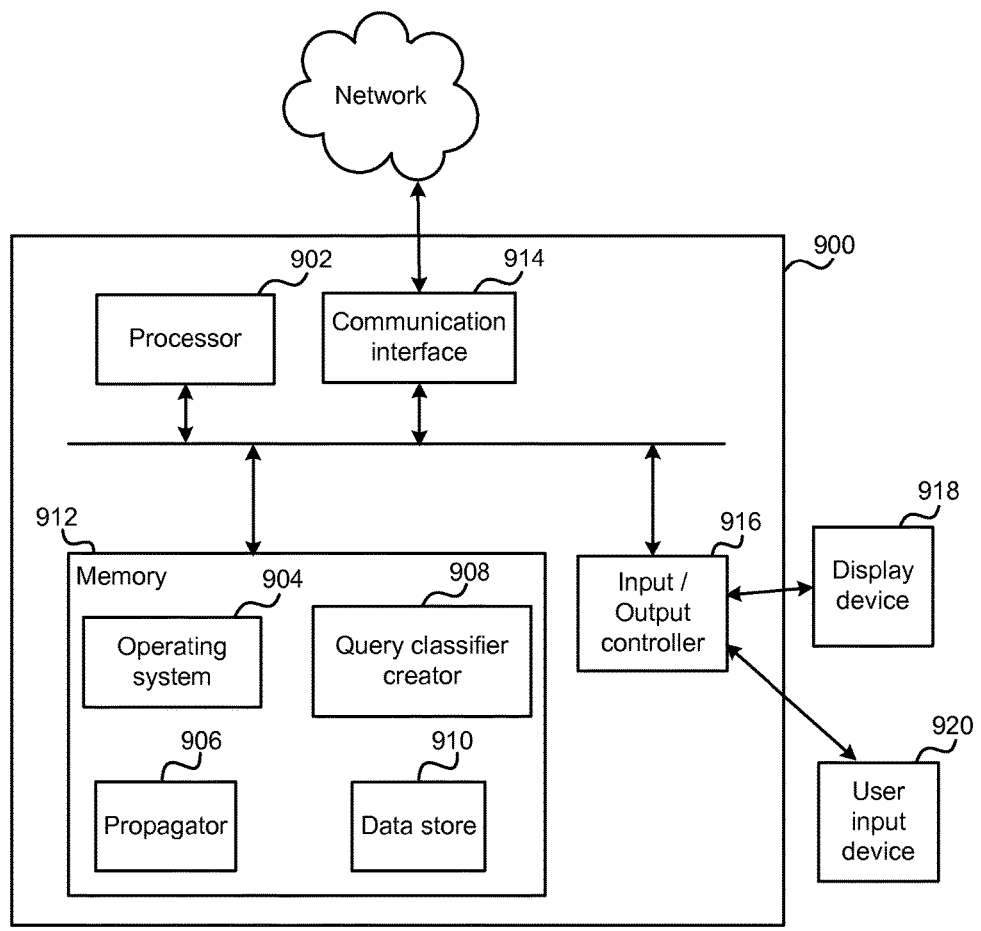
FIG. 9 illustrates an exemplary computing-based device in which embodiments of a query classifier creator may be implemented.

FIG. 9 illustrates various components of an exemplary computing-based device 900 which may be implemented as any form of a computing and/or electronic device, and in which embodiments of a query classifier creator for creating a target language query classifier without the need for human judged target language queries may be implemented. The computing-based device 900 may also implement a method for automatically labeling target language queries as belonging to one of a plurality of query classes.

Computing-based device 900 comprises one or more processors 902 which may be microprocessors, controllers or any other suitable type of processors for processing computer executable instructions to control the operation of the device in order to automatically create a target language query classifier without the need for human judges target language queries. In some examples, for example where a system on a chip architecture is used, the processors 902 may include one or more fixed function blocks (also referred to as accelerators) which implement a part of any of the methods described herein for creating and/or using query classifiers in hardware (rather than software or firmware). Platform software comprising an operating system 904 or any other suitable platform software may be provided at the computing-based device to enable application software to be executed on the device. The device may comprise a query classifier creator 908 arranged to create a query classifier in a target language. It may also comprise a propagator 906 arranged to propagate query class labels in a click graph. A data store 910 may be provided to store created target language query classifiers, target language document classifiers, parameters, classified queries, classified documents, click graphs and other data.

The computer executable instructions may be provided using any computer-readable media that is accessible by computing based device 900. Computer-readable media may include, for example, computer storage media such as memory 912 and communications media. Computer storage media, such as memory 912, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 912) is shown within the computing-based device 900 it will be appreciated that the storage may be distributed or located remotely and accessed via a network or other communication link (e.g. using communication interface 914).

The computing-based device 900 also comprises an input/output controller 916 arranged to output display information to a display device 918 which may be separate from or integral to the computing-based device 900. The display information may provide a graphical user interface. The input/output controller 916 is also arranged to receive and process input from one or more devices, such as a user input device 920 (e.g. a mouse, keyboard, camera, microphone or other sensor). In some examples the user input device 920 may detect voice input, user gestures or other user actions and may provide a natural user interface (NUI). This user input may be used to specify target and source languages, give locations of target and source query logs, specify machine learning algorithms to be used, set parameters, view classification results and for other purposes. In an embodiment the display device 918 may also act as the user input device 920 if it is a touch sensitive display device. The input/output controller 916 may also output data to devices other than the display device, e.g. a locally connected printing device.

Any of the input/output controller 916, display device 918 and the user input device 920 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, RGB camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A method of automatically labeling queries in a target language as belonging to one of a plurality of classes comprising:
   accessing, at a processor, a target language query log comprising target language queries and addresses of target language documents associated with the target language queries;
   automatically labeling a first plurality of the target language documents with labels indicating membership of the plurality of classes, the labeling being based at least in part on source user queries and associated source user documents that are both in a different language than the target language queries and the target language documents;
   propagating the labels from the first plurality of labeled target language documents to a first plurality of the target language queries to obtain automatically labeled target language queries;

for a target language query in a second plurality of the target language queries that are not labeled using the first plurality of labeled target language documents, selecting a uniform resource locator (URL) from a plurality of URLs for a second plurality of the target language documents that correspond to the target language query, wherein the selected URL is selected based on the URL having a highest click frequency among the plurality of URLs, wherein click frequency is a measure of how often a user selected an address of a document in a list of addresses of documents obtained in response to a query; and labeling the target language query based on the selected URL.

2. A method as claimed in claim 1 comprising automatically labeling the first plurality of the target language documents by using information obtained using a source language query log comprising a plurality of source user queries, labeled as belonging to one of the classes, and addresses of the source language documents associated with the source user queries.

3. A method as claimed in claim 2 comprising using the source language query log to select addresses of source language documents according to frequencies of user clicks recorded in the source language query log.

4. A method as claimed in claim 1 wherein automatically labeling the first plurality of the target language documents further comprises using the source language documents labeled as belonging to one of the classes and using a translation module to transform the source language documents into a compatible form of the target language.

5. A method as claimed in claim 1 wherein automatically labeling the first plurality of target language documents further comprises using a document classifier, the document classifier having been trained using labeled documents translated into the target language from a source language.

6. A method as claimed in claim 1 wherein automatically labeling the first plurality of target language documents further comprises extracting topic features from the first plurality of target language documents and using a document classifier to classify the first plurality of target language documents on the basis of the extracted features.

7. A method as claimed in claim 1 wherein automatically labeling the first plurality of target language documents further comprises:
training a document classifier using labeled documents translated into the target language from a source language; and
using the trained document classifier to label the first plurality of target language documents.

8. A method as claimed in claim 7 further comprising training the document classifier using a plurality of unlabeled documents in addition to the labeled documents, the unlabeled documents translated into the target language from the source language.

9. A method as claimed in claim 1 further comprising propagating the labels based on click frequencies recorded in the target language query log.

10. A method as claimed in claim 1 further comprising training a target language query classifier using the automatically labeled target language queries.

11. A method as claimed in claim 1 at least partially carried out using hardware logic.

12. A method of automatically labeling queries in a target language as belonging to one of a plurality of classes comprising:

accessing, at a processor, a target language query log comprising target language queries and addresses of target language documents associated with the target language queries;

automatically labeling a first plurality of the target language documents with labels indicating membership of the plurality of classes, the labeling being based at least in part on semantic index topic modeling applied to source queries and source documents in a different language than the target language queries and the target language documents;

propagating the labels from the first plurality of labeled target language documents to a first plurality of the target language queries to automatically label the first plurality of target language queries;

for a target language query in a second plurality of the target language queries that are not labeled using the first plurality of labeled target language documents, selecting a uniform resource locator (URL) from a plurality of URLs for a second plurality of the target language documents that correspond to the target language query, wherein the selected URL is selected based on the URL having a highest click frequency among the plurality of URLs, wherein click frequency is a measure of how often a user selected an address of a document in a list of addresses of documents obtained in response to a query; and labeling the target language query based on the selected URL.

13. A method as claimed in claim 12 wherein automatically labeling the first plurality of the target language documents further comprises using information obtained using a source language query log comprising a plurality of the source queries, labeled as belonging to one of the classes, and addresses of the source documents associated with the source queries.

14. A method as claimed in claim 12 wherein automatically labeling the first plurality of the target language documents further comprises using the source documents labeled as belonging to one of the classes and using a translation module to transform the source documents into a compatible form of the target language.

15. A method as claimed in claim 12 wherein automatically labeling the first plurality of target language documents further comprises using a document classifier, the document classifier having been trained using labeled documents translated into the target language from a source language.

16. A method as claimed in claim 12 wherein automatically labeling the first plurality of target language documents further comprises extracting topic features from the first plurality of target language documents and using a document classifier to classify the first plurality of target language documents on a basis of the extracted features.

17. An apparatus for automatically labeling queries in a target language as belonging to one of a plurality of classes comprising:
a memory; and
a processor programmed to:
access a target language query log comprising a target language queries and addresses of target language documents associated with the target language queries;
automatically label a first plurality of the target language documents with labels indicating membership of the plurality of classes, the labeling being based at least in part on topic features extracted from source language documents of a different language than the target language documents associated with the target language queries;

propagate the labels from the first plurality of labeled target language documents to a first plurality of the target language queries to automatically label the first plurality of target language queries; and for a target language query in a second plurality of the target language queries that are not labeled using the first plurality of labeled target language documents:

select a uniform resource locator (URL) from a plurality of URLs for a second plurality of the target language documents that correspond to the target language query, wherein the selected URL is selected based on the URL having a highest click frequency among the plurality of URLs, wherein click frequency is a measure of how often a user selected an address of a document in a list of addresses of documents obtained in response to a query; and label the target language query based on the selected URL.

18. An apparatus as claimed in claim 17 wherein automatically labeling the first plurality of language documents with labels indicating membership of the plurality of classes is based on using labeled training documents originating in a source language.

19. An apparatus as claimed in claim 17 further wherein automatically labeling the first plurality of target language documents further comprises extracting topic features from the first plurality of target language documents and using a document classifier to classify the first plurality of target language documents on the basis of the extracted features.

20. An apparatus as claimed in claim 17 wherein propagating the labels is at least partially implemented using hardware logic selected from one or more of the following: a field-programmable gate array, a program-specific integrated circuit, a program-specific standard product, a system-on-a-chip, a complex programmable logic device.

* * * * *